(12) United States Patent
Shimizu

(10) Patent No.: US 7,957,473 B2
(45) Date of Patent: Jun. 7, 2011

(54) DATA TRANSMISSION APPARATUS ENABLING COMMUNICATION WITHOUT BEING INTERFERED BY ENVIRONMENTAL NOISE

(75) Inventor: Toshio Shimizu, Oobu (JP)

(73) Assignee: DENSO WAVE INCORPORATED, Tokyo (JP)

( * ) Notice: Subject to any disclaimer, the term of this patent is extended or adjusted under 35 U.S.C. 154(b) by 989 days.

(21) Appl. No.: 11/826,852

(22) Filed: Jul. 19, 2007

(65) Prior Publication Data
US 2008/0019437 A1    Jan. 24, 2008

(30) Foreign Application Priority Data
Jul. 20, 2006  (JP) .............................. 2006-198243

(51) Int. Cl.
H04L 27/00    (2006.01)
(52) U.S. Cl. ........ 375/259; 375/250; 375/260; 375/262; 375/295; 375/316; 340/10.1; 340/10.2
(58) Field of Classification Search ............... 340/10.1, 340/10.2, 570.1, 870.02; 375/146, 147, 219, 375/250, 259, 262, 295, 299, 316, 327, 350
See application file for complete search history.

(56) References Cited

U.S. PATENT DOCUMENTS

| 6,566,997 | B1 | 5/2003 | Bradin |
| 7,298,288 | B2 * | 11/2007 | Nagy et al. ............... 340/870.02 |
| 7,716,208 | B2 * | 5/2010 | Smith et al. ................... 707/713 |
| 7,873,351 | B2 * | 1/2011 | Yahagi ......................... 455/411 |
| 2006/0031546 | A1 * | 2/2006 | Breitfuss et al. ............. 709/231 |
| 2006/0166622 | A1 * | 7/2006 | Usui et al. ................... 455/63.1 |
| 2007/0046436 | A1 * | 3/2007 | Tanaka ........................ 340/10.2 |
| 2007/0116000 | A1 * | 5/2007 | Ikeda et al. .................. 370/392 |
| 2008/0309490 | A1 * | 12/2008 | Honkanen et al. ......... 340/572.1 |

FOREIGN PATENT DOCUMENTS

| EP | 0 994 364 | 4/2000 |
| JP | A-10-294684 | 11/1998 |

OTHER PUBLICATIONS

Office Action dated Feb. 11, 2009 in corresponding German patent application No. 10 2007 034 009.7-31 (and English translation).

* cited by examiner

Primary Examiner — Shuwang Liu
Assistant Examiner — Hirdepal Singh
(74) Attorney, Agent, or Firm — Posz Law Group, PLC

(57) ABSTRACT

A data transmission apparatus is provided, which is capable of performing good communication with a noncontact data carrier under the circumstances where pulse noise is generated. A noise detection circuit in a reader/writer detects a generation period of noise contained in received signals. A communication time calculating circuit calculates estimated time for communication to be performed for an IC card. A timing signal generation unit determines transmission start timing based on the noise generation period and the estimated communication time.

19 Claims, 14 Drawing Sheets

FIG.12A

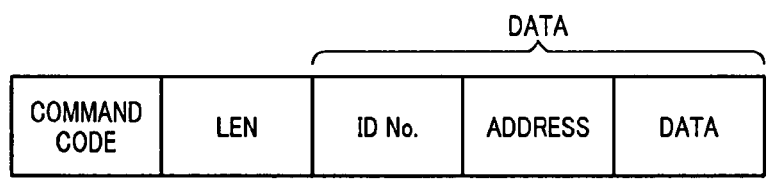

COMMAND CODE    : COMMAND FOR CARD
LEN             : THE NUMBER OF BYTES IN DAT SECTION
ID              : CARD ID
ADDRESS         : DATA ADDRESS IN CARD
THE NUMBER OF DATA : COMMAND CODE IS "READ" : DATA TO BE READ OUT
                    COMMAND CODE IS "WRITE" : DATA TO BE WRITTEN IN

■READ COMMAND
    COMMAND CODE    : READ COMMAND
    LEN             : THE NUMBER OF DATA
    ID              : **
    ADDRESS         : 0000
    NUMBER OF DATA  : 255

FIG.12B

| COMMAND CODE   : READ COMMAND | COMMAND CODE   : READ COMMAND |
| LEN            : THE NUMBER OF DATA | LEN            : THE NUMBER OF DATA |
| ID             : ** | ID             : ** |
| ADDRESS        : 0000 | ADDRESS        : 0100 |
| NUMBER OF DATA : 100 | NUMBER OF DATA : 155 |

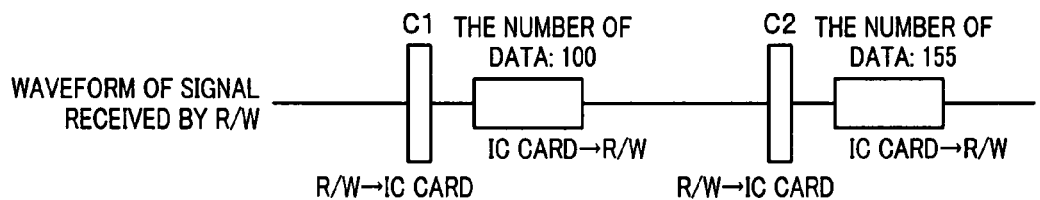

DATA TRANSMISSION APPARATUS ENABLING COMMUNICATION WITHOUT BEING INTERFERED BY ENVIRONMENTAL NOISE

CROSS-REFERENCE TO RELATED APPLICATION

This application is based on and claims the benefit of priority from earlier Japanese Patent Application No. 2006-198243 filed Jul. 20, 2006, the description of which is incorporated herein by reference.

BACKGROUND OF THE INVENTION

1. Technical Field of the Invention

The present invention relates to a data transmission apparatus, and in particular, to a data transmission apparatus which is capable of performing good communication with a non-contact data carrier even in a situation where a pulse noise is generated.

2. Related Art

A variety of kinds of data transmission apparatuses have been known. As one example, Japanese Patent Application Laid-Open Publication No. 10-294684 discloses a data transmission apparatus capable of performing normal data communication under the circumstances where external noise is caused intermittently. In order to perform normal data communication, this apparatus amplifies and detects noise received by an antenna to detect the noise level while no signal is transmitted from a transmitting antenna coil. When the noise level is low, the transmission is started, and when the noise level becomes high, the transmission is not started until the noise level becomes low.

However, the foregoing publication is for such noise as background noise, for example, of this literature. Therefore, difficulty arises with such a technique in making communication under the circumstances where a pulse noise is caused within an extremely short period of time. For example, as shown in FIG. 16, let us assume that pulse noise is detected as having been caused (see FIGS. 16(c) and 16(d)) under the circumstances where a motor is used (see FIG. 16(a)). Upon reception of command (read command or write command) transmission instructions from a host device (see FIG. 16(b)), a reader/writer recognizes, during the time when no pulse noise is caused, that the noise level has been reduced and starts transmission for an IC card (see FIG. 16(e)). Then, a pulse noise that is produced at the time instant of return transmission from the IC card may interfere with the return transmission (see FIGS. 16(c) and 16(f)) it is highly possible that it will cause a transmission error.

SUMMARY OF THE INVENTION

The present invention has been made in light of the circumstances described above, and has as its object to provide a data transmission apparatus which is capable of making good communication with a noncontact data carrier under the circumstances where pulse noise is generated.

In order to accomplish the above object, as one aspect, the present invention provides an apparatus for communicating data with a data carrier by transmitting and receiving a signal to and from the data carrier without contact therebetween, the apparatus comprising: detecting means for detecting a period of generation of noise contained in the signal received by the apparatus; estimating means for estimating a time required from a start of communication scheduled next to an end of the communication; deciding means for deciding a start time instant of the communication on the basis of the detected period of generation of the noise and the estimated time; and performing means for performing the communication so as to be started at the decided start time instant. Practically, the start of the communication is a start of transmission a command from the apparatus to the data carrier and the end of the communication is an end of receiving a response from the data carrier.

Thus, under the circumstances where pulse noise is periodically generated, noise interference can be avoided to well communicate with the data carrier.

It is preferred that the apparatus further comprises means for determining whether or not the communication has been ended successfully, wherein the deciding means comprises means for determining whether or not the detected period of generation of the noise is over a period of time obtained by doubling the estimated time, the decided start time instant being a time instant when it is determined that the detected period of generation of the noise is over the period of time obtained by doubling the estimated period of time, and the performing means comprises means for re-performing the communication immediately when it is determined that the communication has not been ended successfully.

Specifically, even when once resumed communication has unavoidably been interfered by noise, transmission can be completed without being interfered by the noise by immediately performing retrial transmission where the noise generation period is larger by a factor of two or more than the estimated communication time.

It is also preferred that the deciding means comprises means for comparing the detected period of generation of the noise with the estimated time to determine whether or not it is unavoidable to be interfered by the noise if the command is transmitted immediately after the comparison is made; and means for postponing the decided start time instant until a time instant immediately after the next generation of the noise if it is determined that it is unavoidable to be interfered by the noise.

Thus, as to the transmission started after postponement, noise interference can hardly be received.

BY way of example, the deciding means is configured to decide the start time instant so that the response from the data carrier is started immediately after the next generation of the noise.

Thus, data waveform of a response signal returned by the data carrier has amplitude smaller than the waveform of the transmission data, and which response signal is liable to be influenced by the noise. Accordingly, in order to normalize communication, it is important to avoid interference of noise which is generated while the data carrier is returning a response signal. Therefore, by starting transmission at the timing when a response from the data carrier is estimated to be started immediately after generation of the subsequent noise, response from the data carrier can be normally received even when the noise is generated during the communication.

Preferably, the deciding means may be configured to decide the start time instant within a period selected from the period of generation of the noise so that the communication is ended within the selected period, the selected period being longer than the estimated time.

The above configuration may allow completion of communication without receiving an interference of noise even when the noise is generated with a more complicated pattern.

Still preferably, the deciding means may be configured to decide the start time instant within a period selected from the period of generation of the noise so that the communication is ended within the selected period, the selected period being longer than the estimated time.

The above configuration may enable communication avoiding noise interference even when the generated noise has a plurality of periods.

Still preferably, the detecting means may be configured to detect the period of generation of each of a plurality of types of noises of which levels are different from each other, the noises being contained in the signal received by the apparatus, and the deciding means may be configured to decide the start time instant within a period selected from the periods of generation of the plurality of types of noises so that the communication is ended within the selected period, the selected period being longer than the estimated time.

Specifically, when the initial estimated communication time is much longer than the period of the noise generated at that time instant, the command to be transmitted can be divided, so that the time required for one-time communication can be shortened to thereby readily avoid interference of noise.

It is preferred that the deciding means may comprise means for determining whether or not it is avoidable that the communication is interfered with the noise based on the detected period of generation of the noise and the estimated time; means for dividing a command for the communication into a plurality of commands so that communication on each divided command is shorter than the communication on the before-divided command; means for estimating a time required for the communication on each divided command; and means for setting a stat time instant at which the communication on each divided command is started.

Thus, each of the divided commands can be transmitted according to the sequence of transmission, so that each communication can reliably avoid interference of noise.

In the above configuration, the dividing means may be configured to produce the divided commands so that the time required for the communication on each divided command is within a specified period of the periods of generation of the plurality of types of noises, the noise generating at the specified period having a given level and being the highest in a frequency of the generation.

Thus, all of the divided plurality of commands can be transmitted more promptly.

Further, the dividing means may be configured to produce the divided commands so that the time required for the communication on each divided command is within each of plural specified periods of the periods of generation of the plurality of types of noises, the noise generating at the specified period having a given level.

Thus, the commands that have been divided according to the noise generation pattern can be more flexibly transmitted.

BRIEF DESCRIPTION OF THE DRAWINGS

In the accompanying drawings:

FIG. 12A illustrates one example of a command format transmitted by a reader/writer;

FIG. 12B is a timing diagram illustrating a case where read command has been divided;

DETAILED DESCRIPTION OF THE PREFERRED EMBODIMENTS

First Embodiment

Hereinafter is described a first embodiment of the present invention with reference to FIGS. 1-4.

Figure 1:
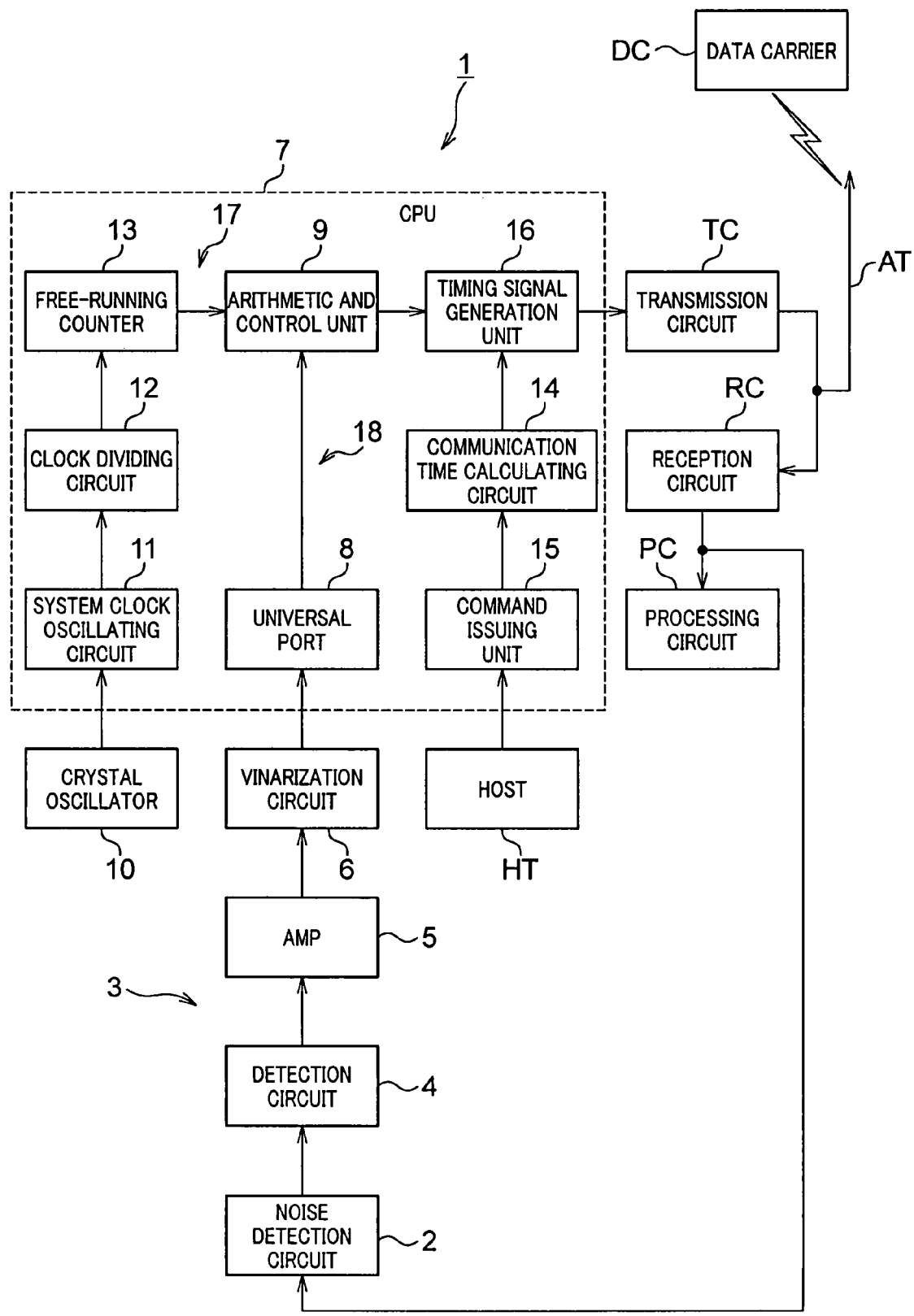
FIG. 1 is a functional block diagram illustrating an inventive principal part of a reader/writer configuration according to a first embodiment of the present invention.

FIG. 1 is a functional block diagram illustrating an inventive principal part of a configuration of a reader/writer serving as a data transmission apparatus. The reader/writer communicates with data carriers in a non-contact fashion. Generally, such non-contact data carriers include, for example, RFID (radio frequency identification) tags and IC (integral circuit) cards.

The reader/writer 1 shown in FIG. 1 performs noncontact communication with a data carrier DC, such as a tag and a card, using radio signals whose frequencies range from several tens of MHz to several hundreds of MHz. The reader/write 1 is connected with a transmission circuit TC for data transmission, reception circuit RC for data reception, and processing circuit PC for data processing. Both the transmission circuit TC and the reception circuit RC are electrically connected with an antenna AT for transmitting and receiving radio signals to and from data carrier DC. The configurations of the transmission circuit TC, reception circuit RC, and processing circuit PC are known, and therefore are not detailed here.

In FIG. 1, the reader/writer 1 receives noise with a noise detection circuit 2 from the antenna AT used for ordinary communication, and the noise detection circuit 2 outputs the noise to a noise frequency detection circuit 3. The noise frequency detection circuit 3 includes a detection circuit 4, an amplifier 5 and a binarization circuit 6. The detection circuit 4 is a peak detection circuit including, for example, a coil, a diode, a resistor and a capacitor. The binarization circuit 6 is made up of a comparator for comparing an amplification output level of the detection circuit 4 with a predetermined threshold level. Specifically, where a level of noise received by the noise detection circuit 2 and detected by the detection circuit 4 is equal to or more than the predetermined value, the output level of the binarization circuit 6 changes from a low level to a high level, for example.

An output signal of the binarization circuit 6 is transmitted to an internal arithmetic and control unit 9 through a universal port 8 of a CPU (microcomputer) 7. A crystal oscillator 10 is externally attached to the CPU 7 so as to be connected to an internal system clock oscillating circuit 11. A system clock outputted from the oscillating circuit 11 is supplied as an operation clock for the CPU 7, per se, while being divided through a clock dividing circuit 12 and supplied to a free-running counter 13.

The free-running counter 13 performs free-running count operation based on the divided clock, and data resulting from the operation is outputted to the arithmetic and control unit 9. The arithmetic and control unit 9 is a control circuit performing arithmetic processing, such as arithmetic operation and logic operation.

Inside the arithmetic and control unit 9, an initial-stage register is adapted to latch the count data of the free-running counter 13 when the output of the binarization circuit 6 given through the universal port 8 changes from a low level to a high level. Then, the previously latched data value of the initial-stage register is transmitted to a subsequent-stage register. A subtractor calculates a difference between two data-register values and outputs the resultant to a timing signal generation unit (transmission timing determining means) 16. In particular, if noise having a level of not less than a predetermined value is generated at a certain period and the noise is detected by the noise frequency detection circuit 3, the output data of the arithmetic and control unit 9 is to indicate a generation period of the noise.

A communication time calculating circuit (communication time estimating means) 14 is given with a command (read command or write command) to be subsequently transmitted. This command is issued by a transmission command issuing unit 15 by being given with a transmission command from a host HT, for example, to the reader/writer 1, or is voluntarily issued by the transmission command issuing unit 15. The transmission time calculating circuit 14 then calculates time required for the subsequent communication based on the contents of the command. The "time required for transmission" refers to the time required from the time instant the reader/writer starts transmission to the time instant the data carrier DC finishes return transmission of all the data corresponding to the contents of the transmitted command.

The timing signal generation unit 16 compares the calculated transmission time (estimated transmission time) with the noise generation period to determine transmission timing to be started for the data carrier DC. With the timing as a trigger, a transmission circuit TC of the reader/writer 1 is then adapted to start the subsequent transmission. In the configuration described above, a series of components from the universal port 8 to the free-running counter 13 constitute a noise generation time detection circuit 17. The detection circuit 17, together with the noise detection circuit 2 and the noise frequency detection circuit 3, constitute a noise detection circuit (noise detecting means) 18.

Figure 2:
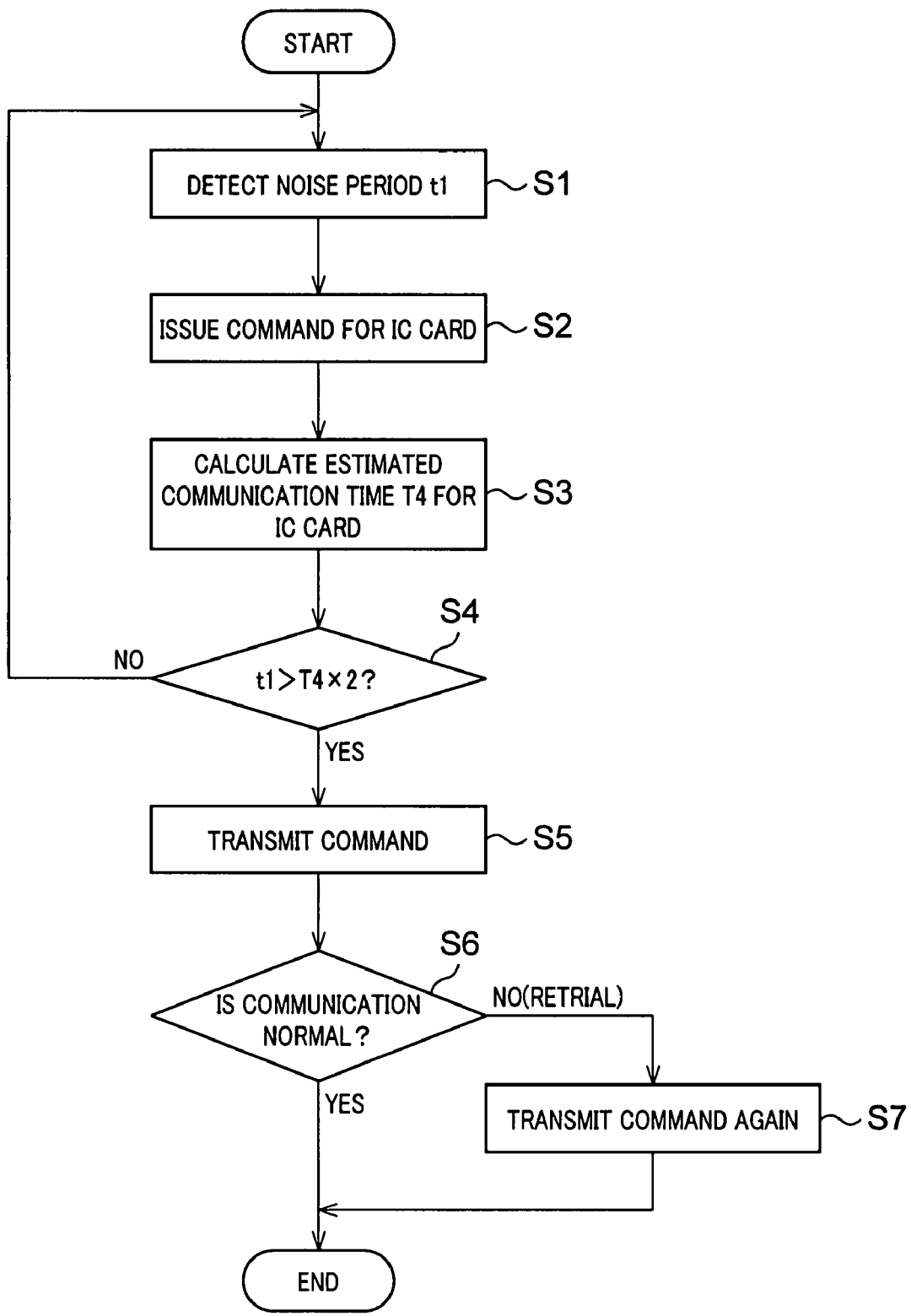
FIG. 2 is a flow diagram illustrating an inventive principal part of a routine performed by the reader/writer.
Figure 3:
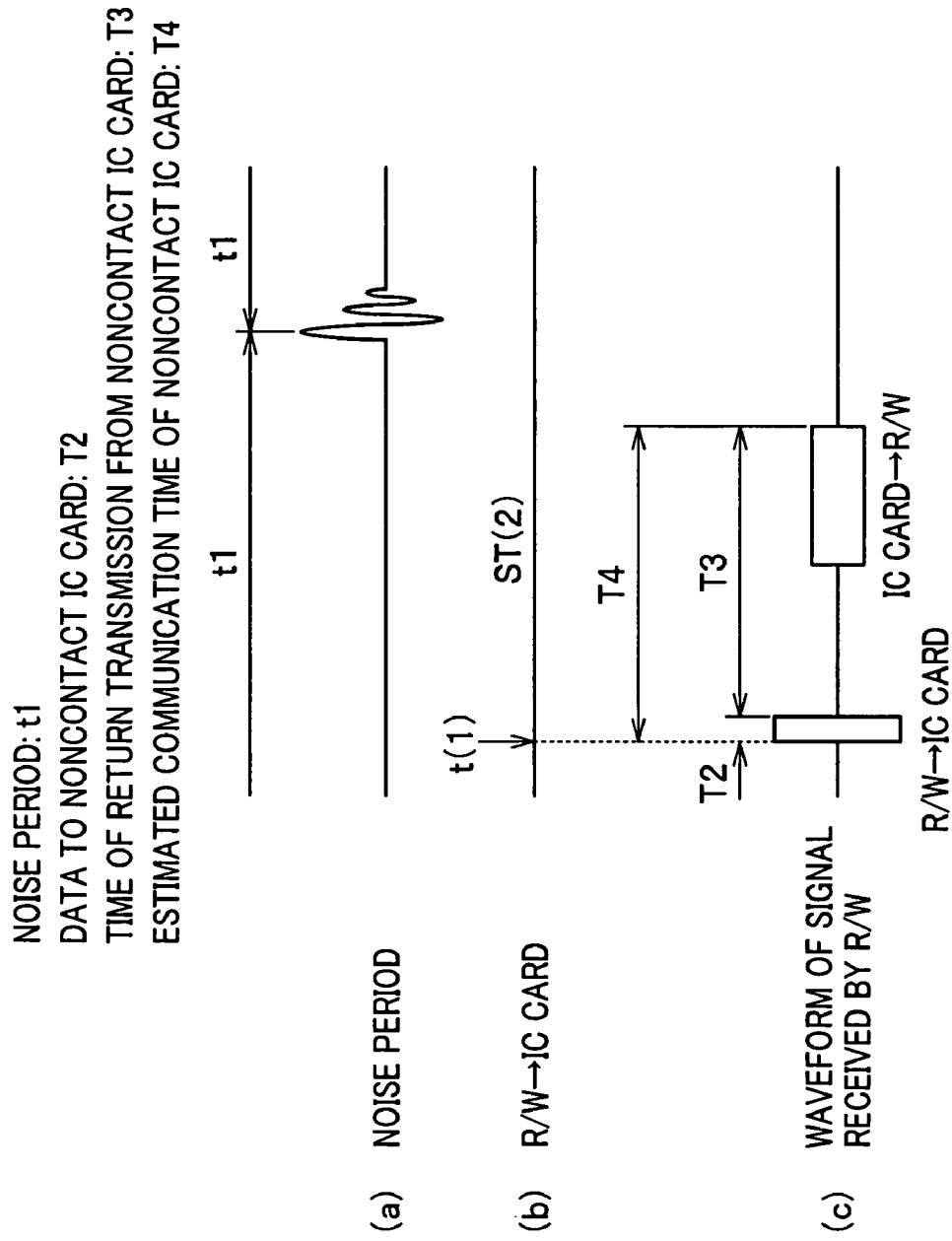
FIG. 3 is a timing diagram illustrating a state where communication started by the reader/writer has been normally completed according to the first embodiment.
Figure 4:
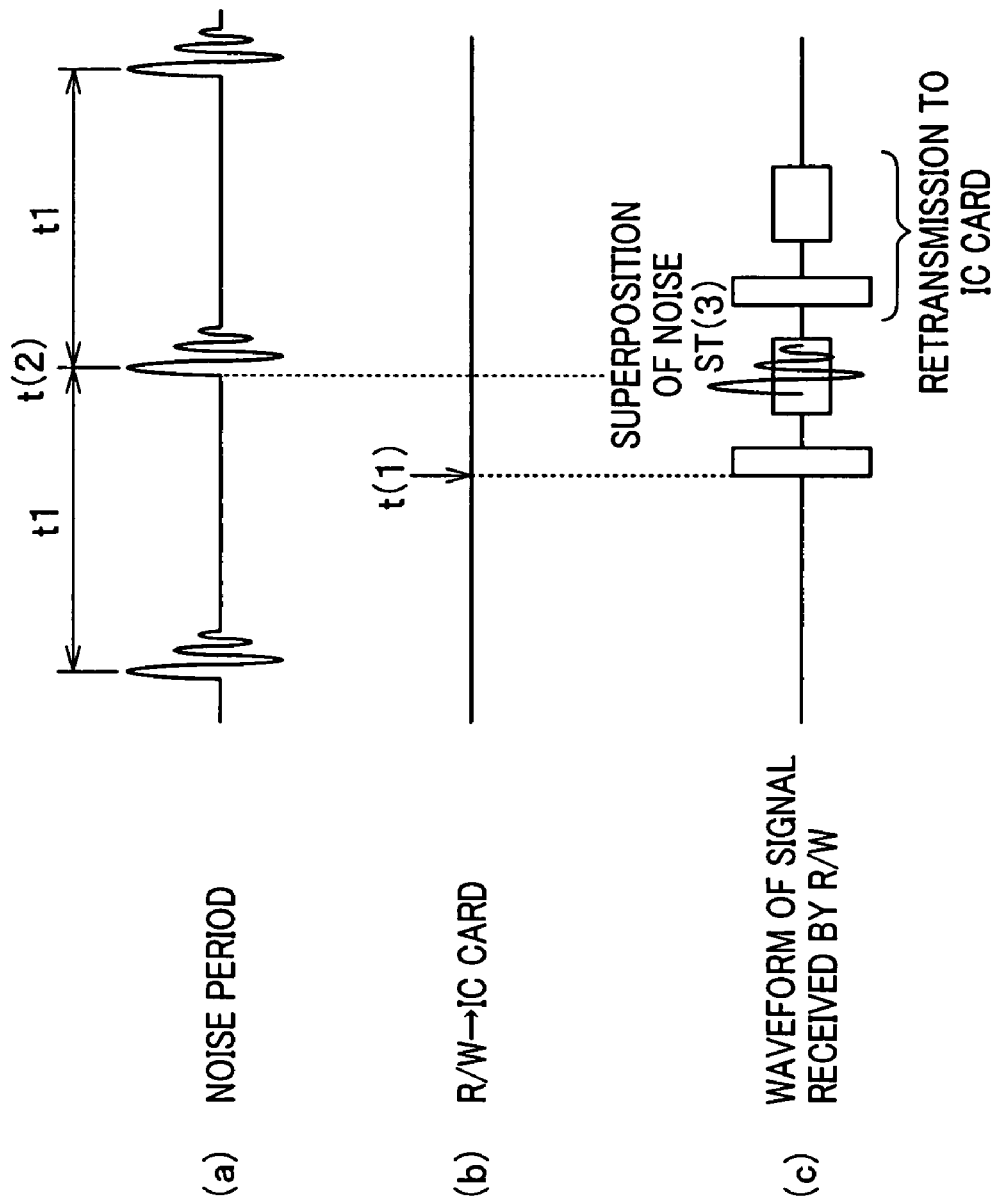
FIG. 4 is a timing diagram illustrating a state corresponding to that illustrated in FIG. 3, where communication started by the reader/writer has not been normally completed.

Referring further to FIGS. 2-4, an operation of the present embodiment will be described. FIG. 2 is a flow diagram illustrating an inventive principal part of a routine performed by the reader/writer (R/W) 1. A noise frequency t1 is detected first, which is generated by the arithmetic and control unit 9 (step S1). When the transmission command issuing unit 15 issues a transmission command for an IC card (step S2), the communication time calculating circuit 14 calculates time T4 required for the communication with the IC card regarding the transmission command (step S3). It should be appreciated that the term "communication time T4" refers, as shown in FIG. 3, to the time required from the time instant the reader/writer 1 starts transmission to the time instant the IC card finishes return transmission.

Subsequently, the timing signal generation unit 16 compares the noise period t1 with the time obtained by multiplying the estimated communication time T4 by a factor of two (step S4). If this results in [t1>2×T4] ("YES"), the timing signal generation unit 16 transmits a command to the IC card (step S5). Then, a determination is made as to whether or not the communication has been normally finished, that is, whether or not the response from the IC card has normally been received, based on a check code, such as CRC (cyclic redundancy check) (step S6). If normally received ("YES"), the routine is ended. If not normally received ("NO"), the command is immediately re-transmitted to perform retrial processing (step S7).

FIG. 3 is a timing diagram illustrating a state where the communication started by the reader/writer 1 has been normally finished. FIG. 3(c) shows, in particular, a waveform image of a data which has been demodulated on the side of a reception circuit RC. The reader/writer 1 starts transmission at step S5 at a time instant t(1). That is, since the noise period t1 is longer than the estimated communication time T4 by a factor of two or more, the command is transmitted to the IC card. When the time required for transmission is T2 and the time from the time instant of completing transmission to the time instant of completing response by the IC card is T3, the estimated transmission time T4 will be "T2+T3." It should be appreciated that the response time T3 is defined by a standard according to the communication system. In FIG. 3(b), a reference ST(2) shows a state where the normal communication is performed without noise superposition.

On the other hand, although the state shown in FIG. 4 satisfies the requirement [t1>2×T4], communication has not been normally finished being interfered (superimposed) by noise during the communication, because the timing of starting transmission has been immediately before the timing of noise generation. In this case, at a time instant t(2), the answer at step S6 results in "NO" and control proceeds to step S7 to perform retransmission (That is, at the time instant t(2), the noise is superposed on the return transmission from the IC card to cause an communication error).

Specifically, if the requirement [t1>2×T4] has been satisfied, the retrial performed immediately after detecting the fact that the communication has not been normally finished being interfered by noise, can reliably guarantee that the communication associated with the retrial will be normally finished. In FIG. 4(b), a reference ST(3) shows a state where the command is transmitted to the IC cart (retrial) and the retrial transmission is necessarily completed normally because the noise period is longer by a factor of two or more.

As described above, according to the present embodiment, the noise detection circuit 18 of the reader/writer 1 detects the period of generation of noise contained in a received signal, and the communication time calculating circuit 14 calculates estimated time for the communication to be made for the IC card. Further, the timing signal generation unit 16 determines the timing for starting transmission based on the noise generation period and the estimated communication time, and thus the interference of the periodically generated noise can be avoided to make good communication with the IC card.

The timing signal generation unit 16 starts transmission where the noise generation period t1 is not less than the estimated communication time T4 by a factor of two, and if the communication has not been normally finished, immediately retries transmission. Therefore, if the once started communication has been interfered by the noise, the communication retried immediately after detecting the interference can be completed without being interfered by the noise.

Second Embodiment

Figure 5:
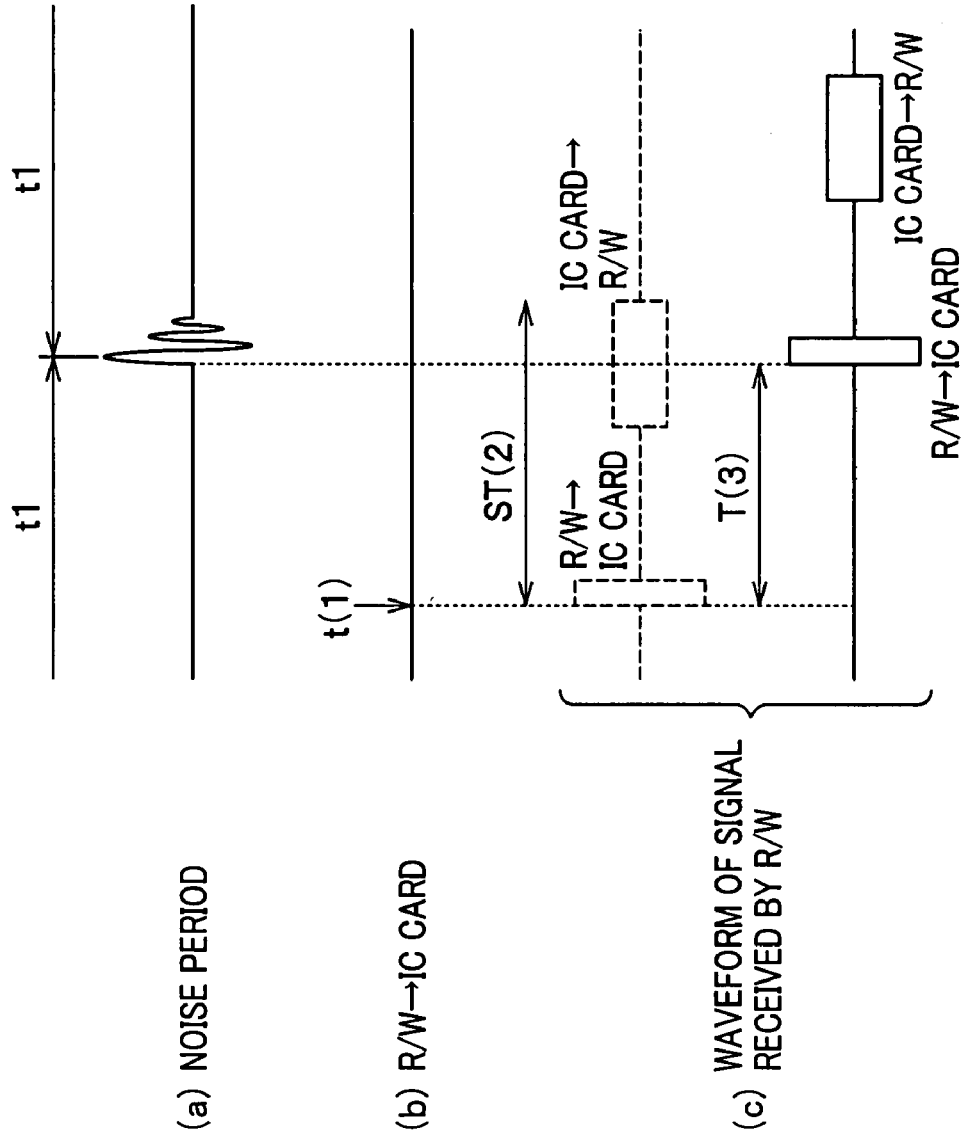
FIG. 5 is a timing diagram illustrating a state where communication started by the reader/writer has been normally completed according to a second embodiment of the present invention.
Figure 6:
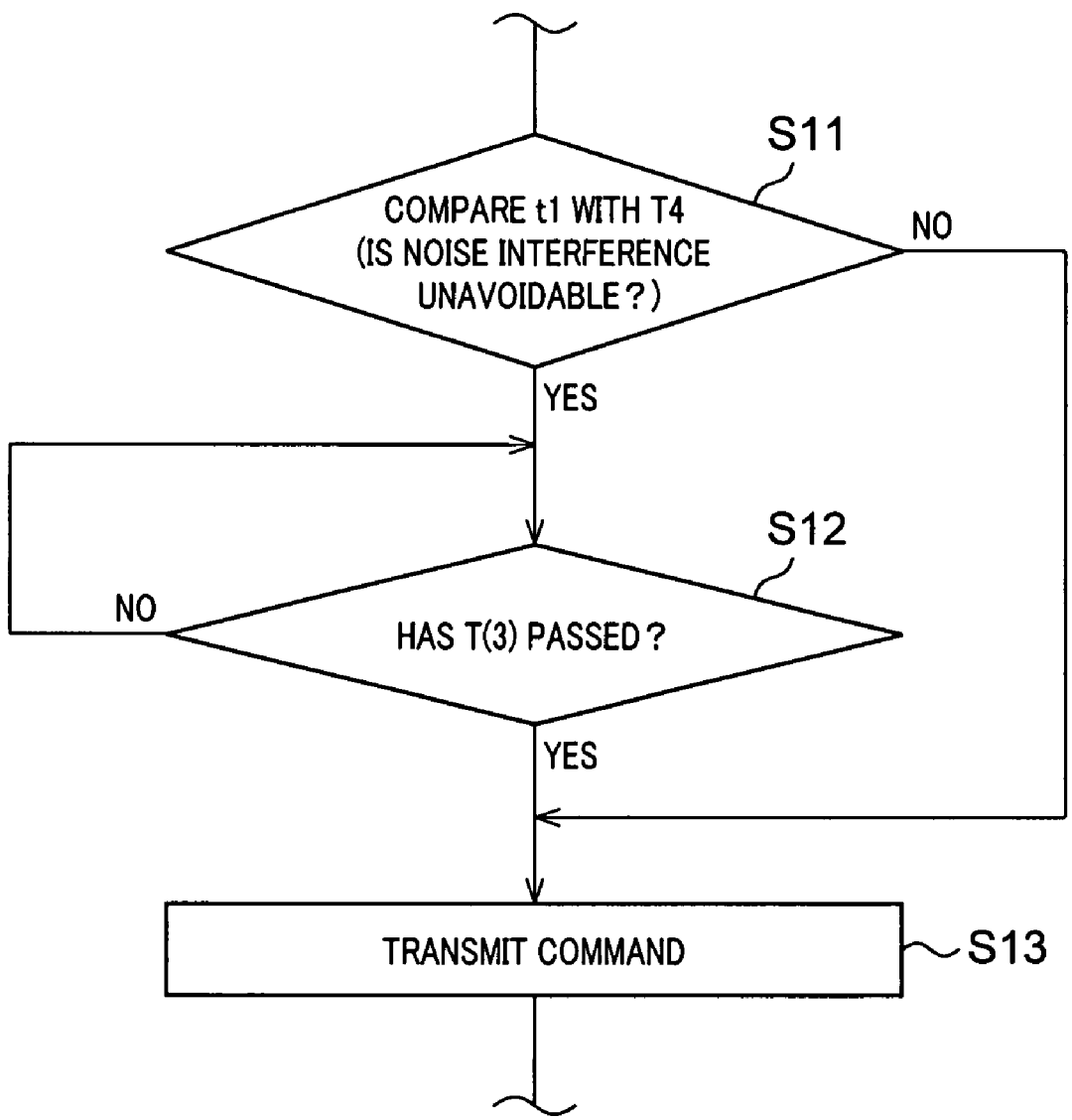
FIG. 6 is a flowchart showing part of processing executed in the second embodiment.

Referring to FIGS. 5 and 6, a second embodiment of the present invention will now be described.

In the second embodiment and subsequent embodiments, the hardware configuration is the same as that employed in the first embodiment. Hence, in the following descriptions, the identical or similar components to those in the first embodiment are given the same reference numerals for the sake of simplifying or omitting the explanation. The description hereinafter therefore is focused on the differences from the first embodiment.

The configuration of the second embodiment is basically the same as that of the first embodiment with an exception of the processing in the timing signal generation unit 16 in determining the transmission timing. In particular, for the noise generated at periods t1 (see FIG. 5(a), where starting transmission at the time instant t(1) (see FIG. 5(b)) is determined to unavoidably cause noise interference (see a state ST(2) in FIG. 5(c)), based on the estimated communication time, the timing signal generation unit 16 stops starting transmission at the time instant t(1). Then, the transmission is started immediately after lapse of a period T(3) when the subsequent noise is estimated to be generated.

Unlike the first embodiment, the second embodiment does not require to satisfy the requirement [t1>2×T4] as a precondition for performing transmission, but only requires to satisfy at least a requirement [t1>T4].

Thus, according to the second embodiment, the timing signal generation unit 16 compares the noise generation period t1 with the estimated communication time T4 (step S11 in FIG. 6). If starting transmission at that time instant is determined to unavoidably cause interference by noise (Yes at step S11), the timing signal generation unit 16 postpones the transmission, and starts the transmission immediately after the subsequent noise generation timing (steps S12 and S13). In this way, the retrial transmission may hardly be interfered by noise.

Third Embodiment

Figure 7:
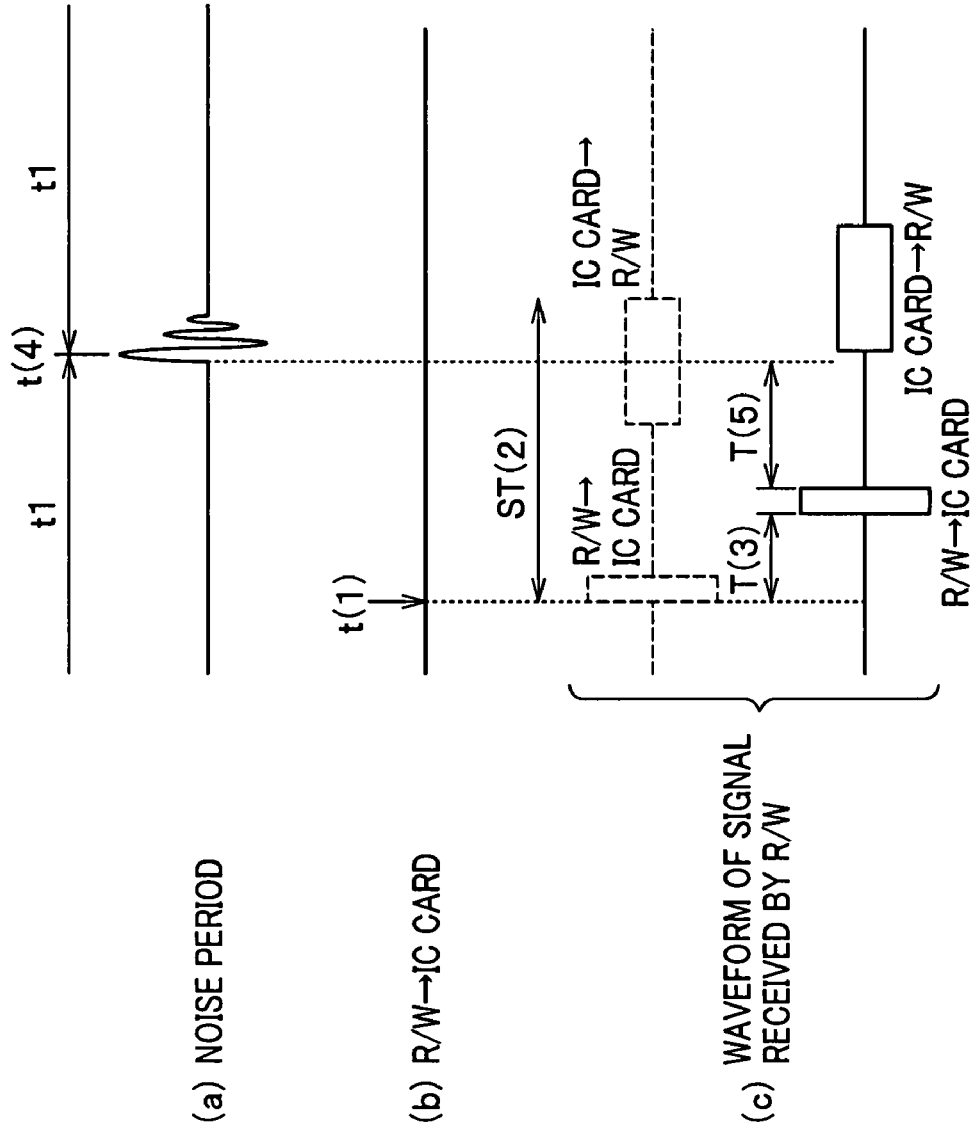
FIG. 7 is a timing diagram illustrating a state where communication started by the reader/writer has been normally completed according to a third embodiment of the present invention.
Figure 8:
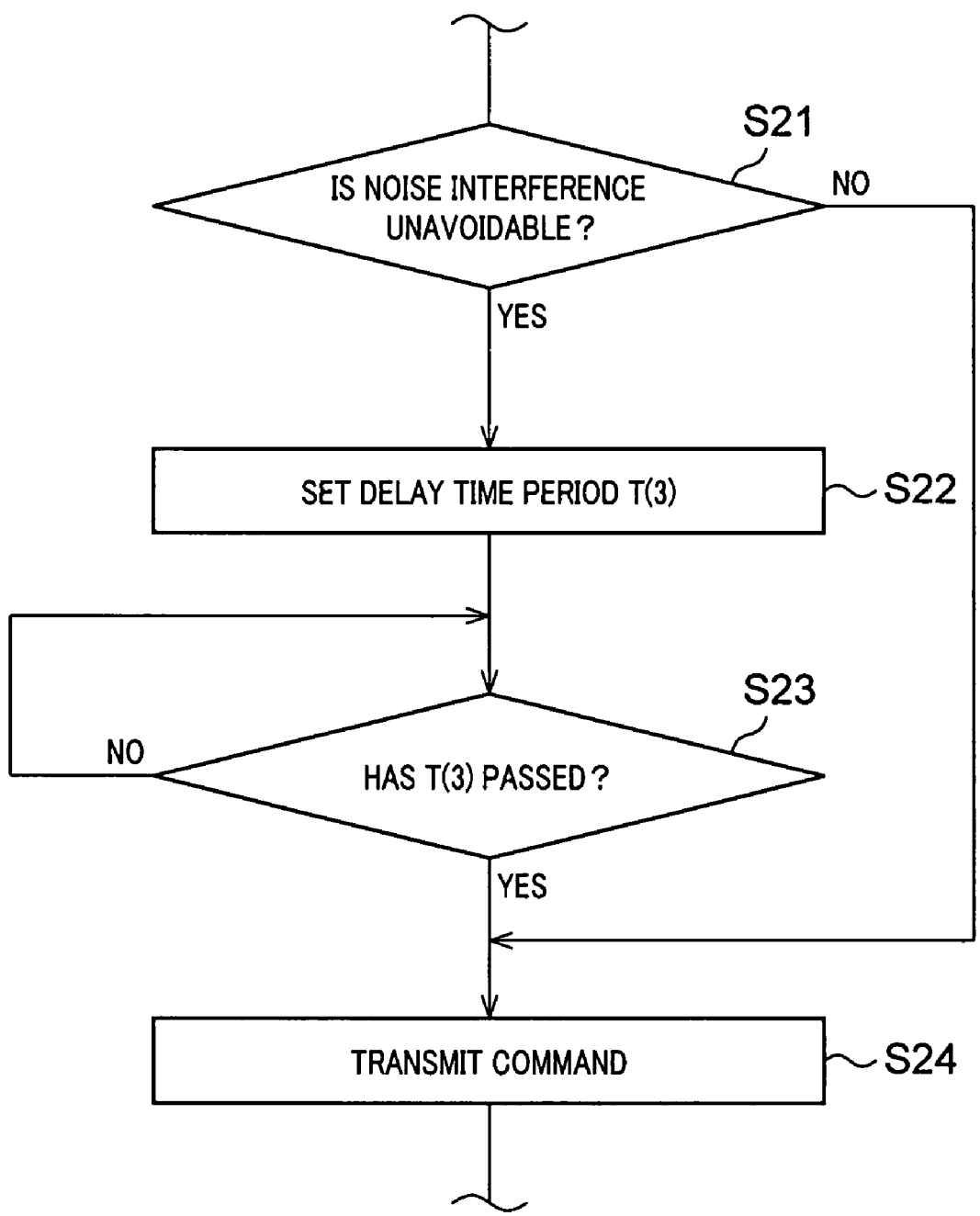
FIG. 8 is a flowchart showing part of processing executed in the second embodiment.

Referring to FIGS. 7 and 8, a third embodiment of the present invention will now be described.

In the third embodiment as in FIG. 2, if it is determined that starting transmission at the time instant t(1) (see FIG. 8(b)) may unavoidably cause interference by noise (see the state ST(2) in FIG. 8(c)), based on the estimated communication time, the timing signal generation unit 16 again stops starting transmission at the time instant t(1). Then, the timing signal generation unit 16 starts transmission prior to a time instant t(4), at which the subsequent noise is estimated to be generated, so that a return transmission from the IC card in response to the subsequently started communication may not be interfered by noise (see FIG. 8(c)).

A period T(5) from the end of the transmission by the reader/writer 1 to the start of return transmission by the IC card is also defined by the communication standard. Thus, the transmission is started with such timing that noise may be generated within the period T(5) and a return transmission from the IC card may thereafter be started.

As described above, in the third embodiment, when it is determined by the timing signal generation unit 16 that starting transmission at the time instant t(1) may unavoidably cause interference by noise (step S21 in FIG. 8), a delay time period T(3) is set in consideration of the period T(5) (step S22). Then the timing signal generation unit 16 delays the timing of transmission by the period T(3) (steps S23 and S24) so that the return transmission from the IC card may be started at the timing immediately after generation of the subsequent noise. As shown in FIG. 8(c), a data waveform of a response signal transmitted from the IC card, which has smaller amplitude than that of a transmission signal from the reader/writer 1, is liable to have an influence of the noise. Therefore, starting transmission at the timing described above may enable normal reception of the return transmission from the IC card irrespective of the noise that may be generated during the communication.

Fourth Embodiment

Figure 9:
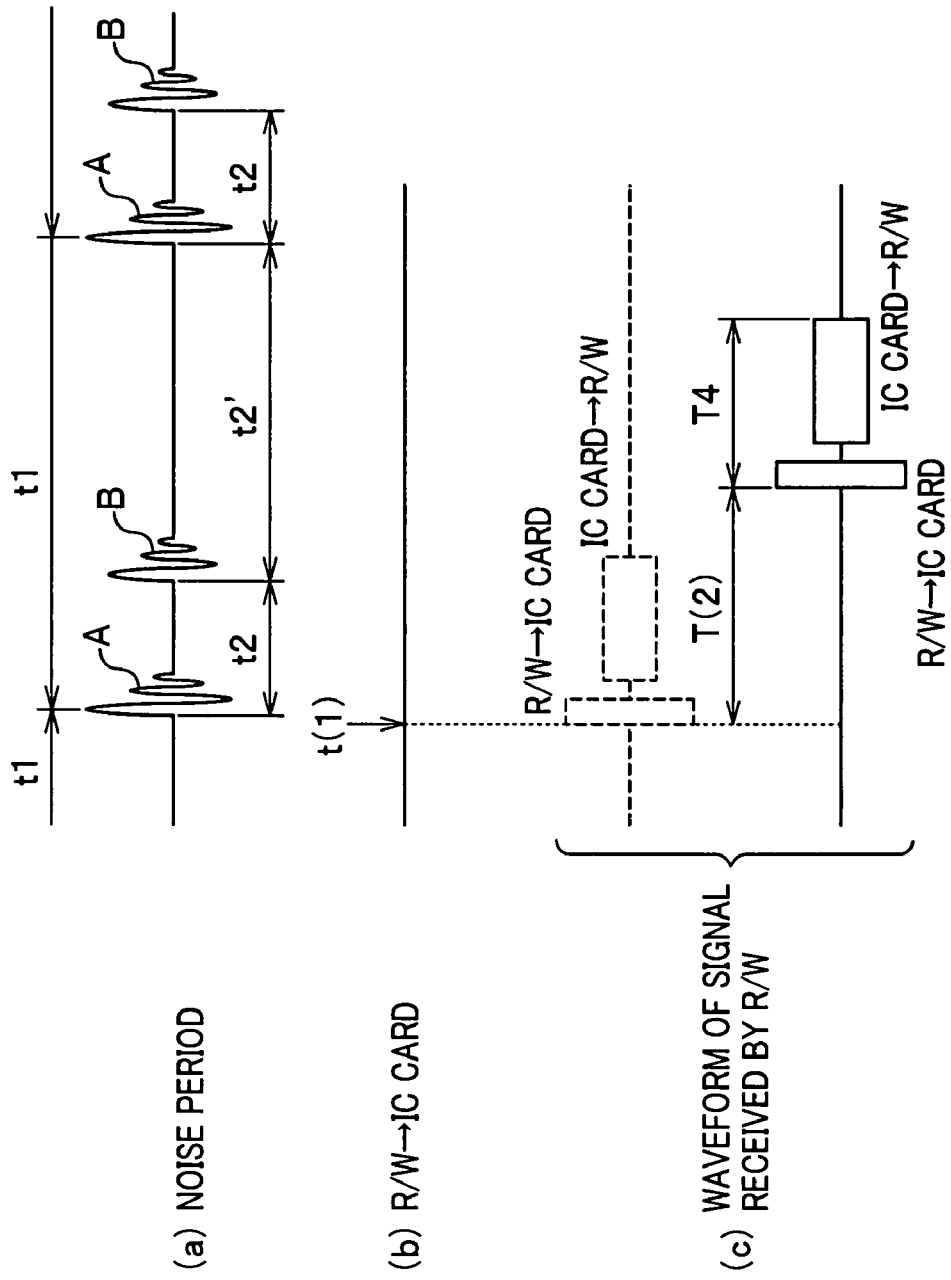
FIG. 9 is a timing diagram illustrating a state where communication started by the reader/writer has been normally completed according to a fourth embodiment of the present invention.

FIG. 9 illustrates a fourth embodiment of the present invention. The fourth embodiment is provided for a case where a noise generation pattern in which two types of noises having amplitude levels A and B are repeatedly generated at periods t1, as shown in FIG. 9(a). In particular, each of the noises A and B has the generation period t1, with the noise B being generated after lapse of a period t2 from the generation timing of the noise A. In this case, the noise detection circuit 18 is configured to detect the generation timing and the generation interval for both of the noises A and B.

Where the noise generation time detection circuit 17 has detected the generation pattern shown in FIG. 9(a), the timing signal generation unit 16 makes a confirmation that a requirement [(t1−t2)>T4] is being satisfied, and then starts transmission, as shown in FIG. 9(c), immediately after generation of the noise B. That is, in FIG. 9(c), a reference T(2) shows adjustment of timing for transmitting a command to the IC card based on the noise periods of t1, t2 and t2' and the communication time of the IC card.

In this way, according to the fourth embodiment, where the detected noises A and B present a predetermined generation pattern in synchronization with the basic period t1, or where the detected noises repeat a predetermined noise generation pattern including one or more noise generation intervals, the timing signal generation unit 16 starts transmission within a period for allowing the individual noise generation intervals in the period t1 to be longer than the estimated communication time T4. Thus, noise generation with more complicated pattern may not cause noise interference to thereby enable completion of the communication.

Fifth Embodiment

Figure 10:
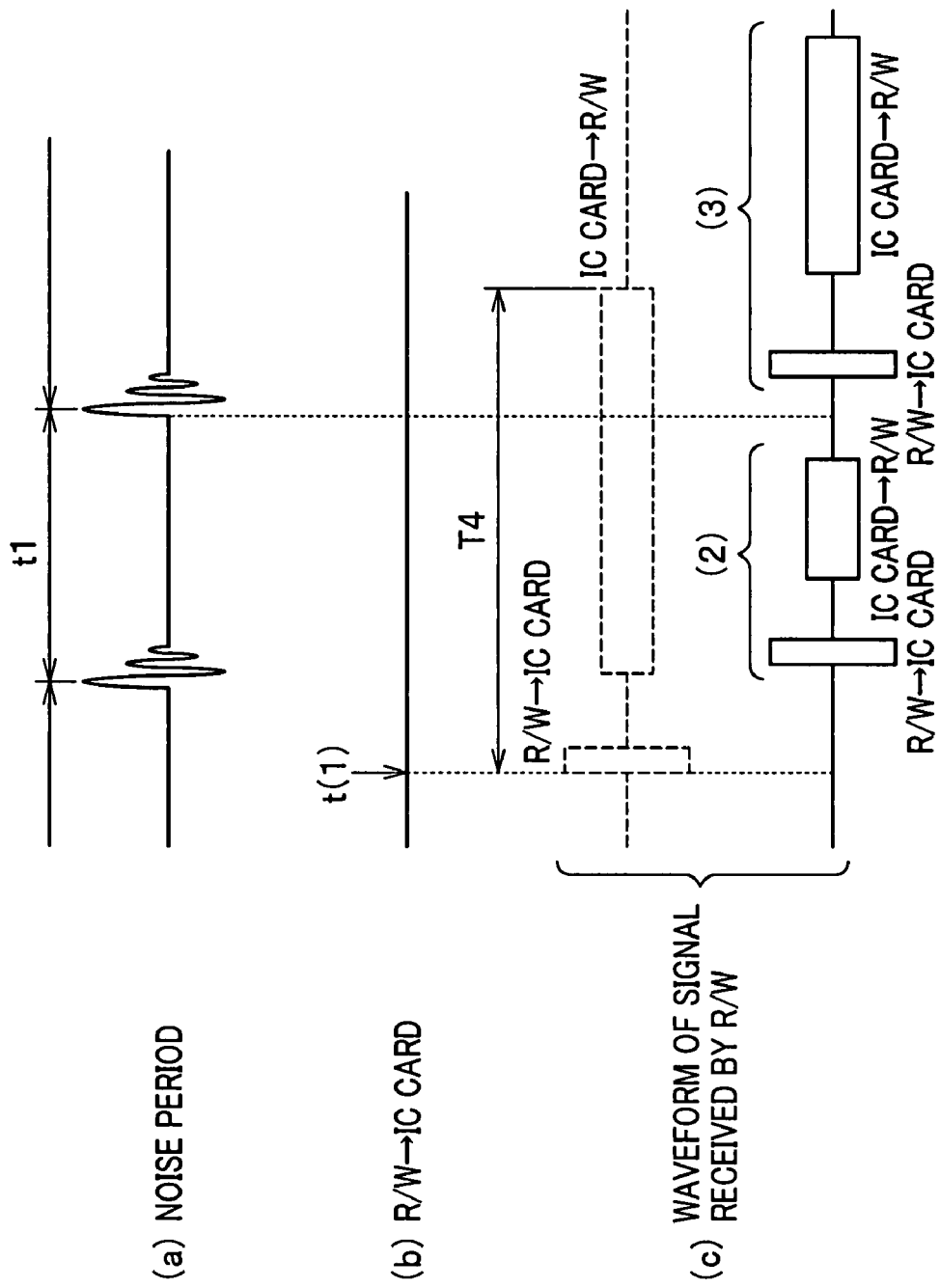
FIG. 10 is a timing diagram illustrating a state where communication started by the reader/writer has been normally completed according to a fifth embodiment of the present invention.
Figure 11:
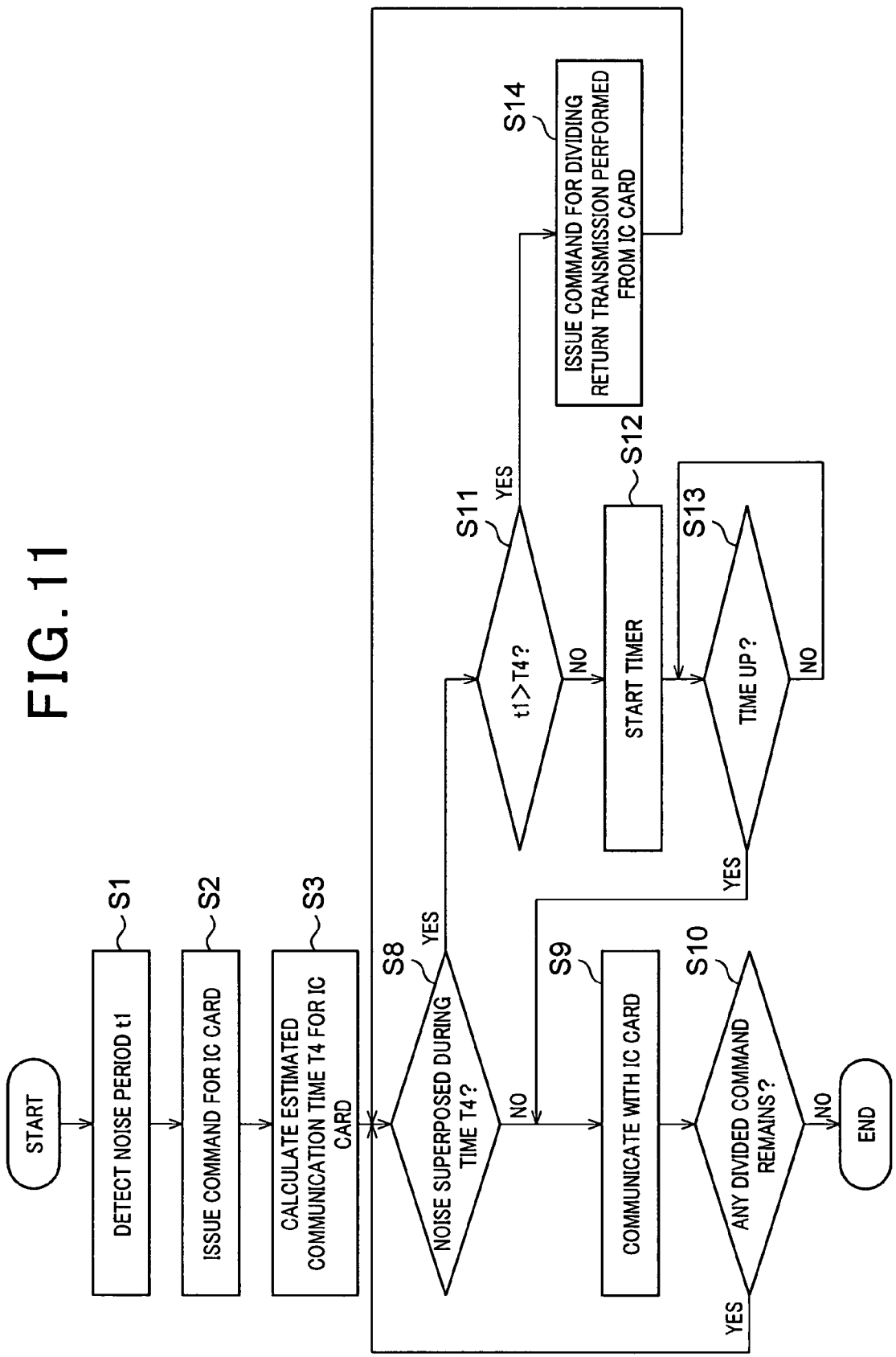
FIG. 11 is a flow diagram illustrating an inventive principal part of a routine performed by a reader/writer.

FIGS. 10-12 illustrate a fifth embodiment of the present invention. In the fifth embodiment, as in the second embodiment, for example, where starting transmission at the time instant t(1) is expected to receive noise interference, adjustment is performed so that the communication time may be more shortened (see FIG. 10(c)). In a flow diagram shown in FIG. 11, upon execution of steps S1 to S3 as in the first embodiment, the timing signal generation unit 16 determines whether or not starting transmission at that time instant may cause noise generation within the estimated communication time T4 to cause noise interference (step S8). If it is determined that no noise interference may be caused ("NO"), communication with the IC card is started (step S9).

On the other hand, if it is determined, at step S8, that noise interference may be caused ("YES") as shown in FIG. 10(c), the timing signal generation unit 16 compares the noise generation period t1 with the estimated communication time T4 (step S11). When the noise generation period t1 is longer than the estimated communication time T4 ("NO"), the timing signal generation unit 16 starts a timer which counts time to allow the subsequently generated noise to pass (step S12). Once the timer has counted up the predetermined period of time ("YES" at step S13), control proceeds to step S9 to start communication with the IC card.

At step S11, if the noise generation period t1 is shorter than the estimated communication time T4 ("YES"), a command is divided so that the time required for the return transmission by the IC card may be shortened to shorten the communication time T4 (step S14). Then, control returns to step S3 to recalculate the estimated communication time T4 for each of the divided commands.

Referring now to FIGS. 12A and 12B, the process at step S14 is described in detail. FIG. 12A illustrates an example of a format of a command transmitted by the reader/writer 1. The command is made up of "Command Code/LEN/ID_No./Address/Data". The "Command Code" is a code indicating a type of the command, such as read or write. The "LEN" indicates the number of bytes of a DAT section, i.e. the "ID_No./Address/Data", that follows the "LEN".

The "ID_No." indicates an ID of the IC card to make communication with. The "Address" indicates a starting address of an internal data of the IC card to be written in and read out. The "Data" indicates the number of data to be read out where the "Command Code" is "read", and the number of data to be written in where the "Command Code" is "write".

For example, let us assume that, in case the reader/writer 1 has initially attempted to transmit a "read command", the contents of the command have been to perform readout from the "address:0000" with the number of data being "255". In this case, the communication time for the IC card may become long and exceed the noise generation period t1 because the "255" number of read data has to be transmitted in response to the above command.

Under the circumstances as mentioned above, the timing signal generation unit 16 gives a command to the command issuing unit 15. Following this command, as shown in FIG. 12B, the initial read command is divided, so that one-time communication time for each of the divided commands may become shorter than the noise generation period t1. In particular, it is so arranged that, following a command C1, readout from the "address: 0000" is performed with the number of data being "100", and following a command C2, readout from the "address: 0100" is performed with the number of data being "155".

By performing the process as described above at step S14, the next time the process at step S8 is performed, it may be confirmed that the noise generation period t1 is not longer than the estimated communication time T4 ("NO"). Then, communication is executed at step S9 (e.g., transmission of the command C1). At the subsequent step S10, it is determined whether or not any command that has been divided at step S14 remains. If any command remains ("YES"), control returns to step S3 to continue transmission (e.g., transmission of the command C2). When there remains no command ("NO"), the routine is ended.

Thus FIG. 10 can be used to summarize the foregoing as follows. At a time instant t(1), the reader/writer 1 receives a command from a host device and determine that noise superposition may be caused during the return transmission from the IC card. In reply to this determination, a command to be transmitted is divided into, for example, two commands, and then the first divided command is transmitted to the IC card (see a state ST(2) in FIG. 10(d)). At an appropriate time instant after the transmission of the first divided command, the second divided command, which is a remaining one, is transmitted to the IC card (see a state ST(3) in FIG. 10(d)).

As described above, according to the fifth embodiment, the command issuing unit 15 divides the command into several commands once the noise interference is determined as being unavoidable, and the timing signal generation unit 16 starts transmission for each divided command based on the estimated communication time. Thus, the time required for one-time communication can be reduced to readily avoid the noise interference. Further, where a transmission sequence has been designated to the divided commands, the timing signal generation unit 16, upon determining that the noise interference is avoidable in light of the estimated communication time T4 for the command to be subsequently transmitted, starts transmission of the command. Thus, the divided commands can be appropriately transmitted according to the transmission sequence.

The present invention is not limited to the embodiments described above and illustrated in the figures, but the following modification or extension may be possible.

Figure 13:
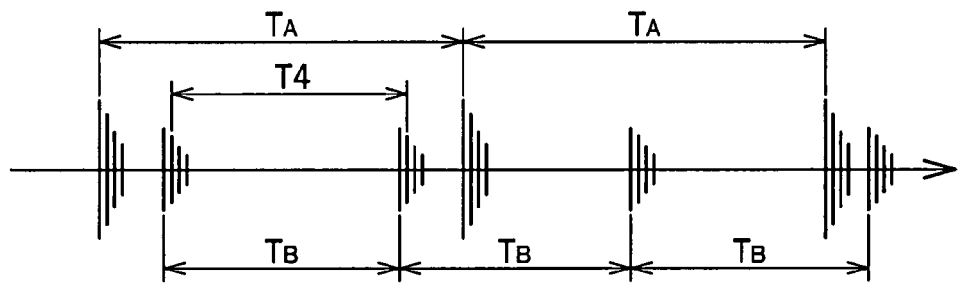
FIG. 13 is a timing diagram illustrating a modification.

For example, as shown in FIG. 13, in case a plurality of noise generation periods are present, the noise detection circuit 18 may be configured in such a way that the individual periods (TA and TB) can be separately detected. Also, in this case, the timing signal generation unit 16 may be configured in such a way that transmission is started within a period for allowing the individual noise generation intervals of the plurality of generation periods to become longer than the estimated communication time T4. In such a configuration, even under the complicated noise generation conditions, communication can be performed by avoiding the noise interference.

Figure 14:
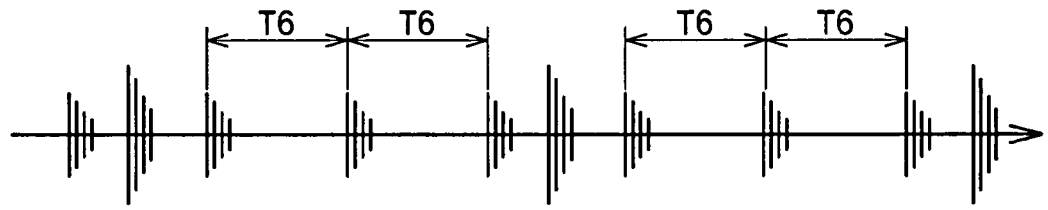
FIG. 14 is a timing diagram illustrating another modification.

As shown in FIG. 14, in the fifth embodiment, the command issuing unit 15 may be configured to divide the command so that the estimated communication time T4 of each divided command may fall within a noise generation interval of the most frequently generated noise, which interval is not less than a predetermined value, or may fall within time T6 (T6>T4). In this way, all the plurality of divided commands can be more promptly transmitted.

Figure 15:
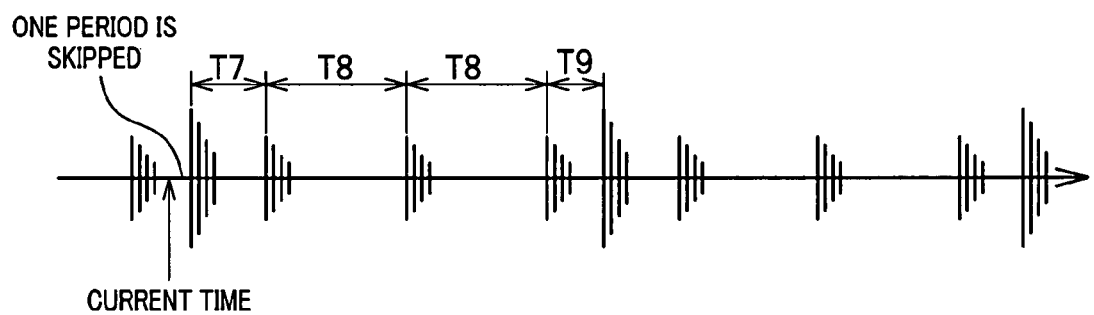
FIG. 15 is a timing diagram illustrating another modification.
Figure 16:
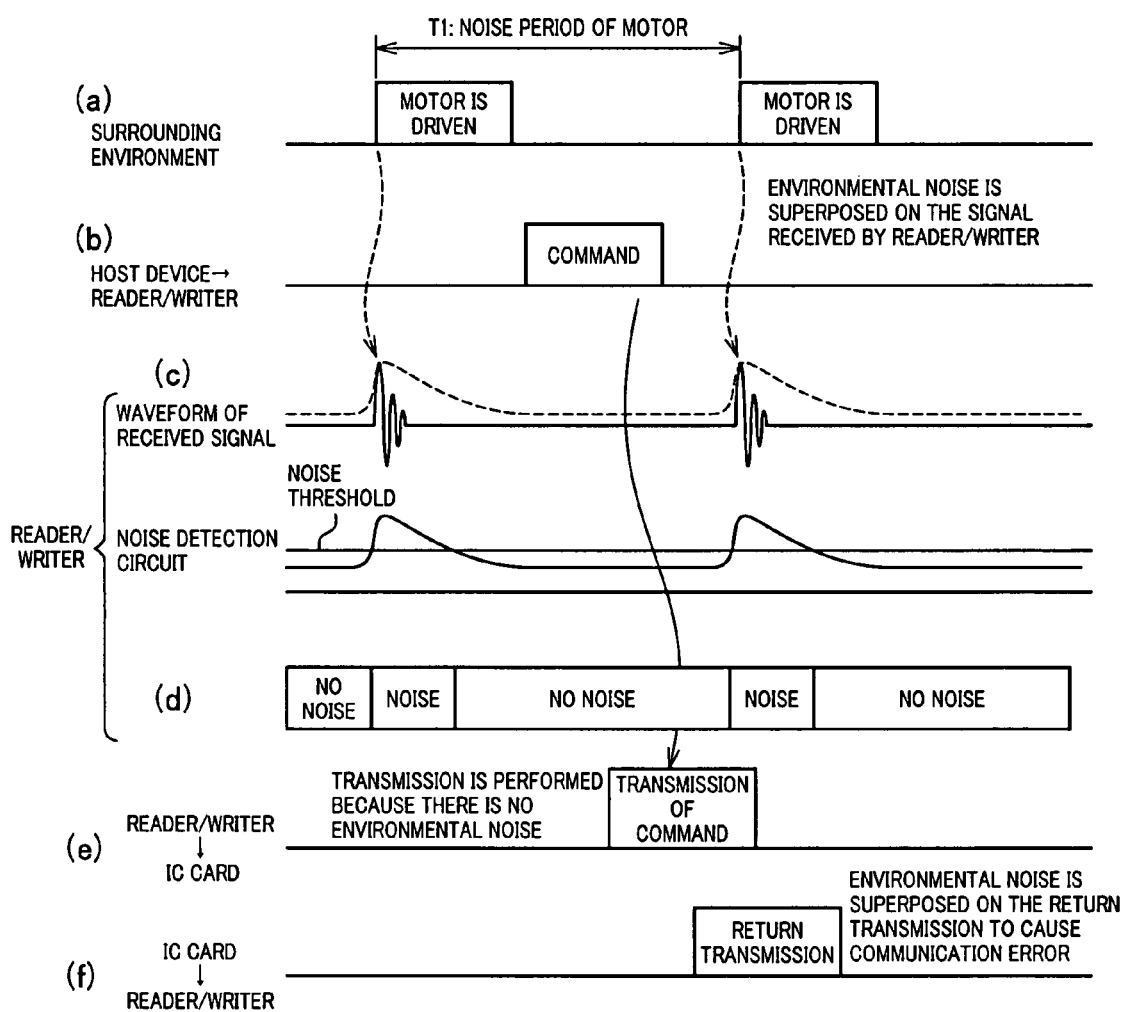
FIG. 16 is a timing diagram illustrating a conventional state where communication is made under the circumstances where pulse noise is generated.

As shown in FIG. 15, the command issuing unit 15 may be configured to divide a command in such a way that the estimated communication time may fall within each of the plurality of noise generation intervals in the noise generation pattern, each interval having not less than a predetermined value. In particular, in case of FIG. 15, the command is divided so that the communication time may fall within each of periods T7, T8 and T9. Such a configuration may enable more flexible transmission of commands divided according to the generation pattern.

In the fifth embodiment, in case the estimated communication time is long because of a large amount of data to be written into the IC card following a write command, writing is performed by dividing the write command, i.e. by dividing the initial write data into a plurality of write data.

In the configuration of the reader/writer 1 shown in FIG. 1, the output signal of the amplifier 5 may be given to an A/D converter port provided at the CPU 7, rather than to the binarization circuit 6 and the universal port 8, to output the data A/D converted in the CPU 7 to the arithmetic and control unit 9. Then, the arithmetic and control unit 9 may determine latch timing according to the size of the data.

This configuration may be applied at least to a reader (data transmission apparatus) having a function of only reading out data from a data carrier.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. An apparatus for communicating data with a data carrier by transmitting and receiving a signal to and from the data carrier without contact therebetween, the apparatus comprising:
    detecting means for detecting a period of generation of noise contained in the signal received by the apparatus;
    estimating means for estimating a time required from a start of communication scheduled next to an end of the communication, the start of the communication being a start of transmission of a command from the apparatus to the data carrier, and the end of the communication being an end of receiving a response from the data carrier;
    deciding means for deciding a start time instant of the communication on the basis of the detected period of generation of the noise and the estimated time; and
    performing means for performing the communication so as to be started at the decided start time instant; and
    means for determining whether or not the communication has been ended successfully,
    wherein the deciding means comprises means for determining whether or not the detected period of generation of the noise is over a period of time obtained by doubling the estimated time.

2. The apparatus of claim 1, wherein the decided start time instant being a time instant when it is determined that the detected period of generation of the noise is over the period of time obtained by doubling the estimated period of time, and
    the performing means comprises means for re-performing the communication immediately when it is determined that the communication has not been ended successfully.

3. The apparatus of claim 1, wherein the deciding means comprises
    means for comparing the detected period of generation of the noise with the estimated time to determine whether or not it is unavoidable to be interfered by the noise if the command is transmitted immediately after the comparison is made; and
    means for postponing the decided start time instant until a time instant immediately after the next generation of the noise if it is determined that it is unavoidable to be interfered by the noise.

4. The apparatus of claim 1, wherein the deciding means is configured to decide the start time instant so that the response from the data carrier is started immediately after the next generation of the noise.

5. The apparatus of claim 1, wherein the deciding means is configured to decide the start time instant within a period selected from the period of generation of the noise so that the communication is ended within the selected period, the selected period being longer than the estimated time.

6. The apparatus of claim 1, wherein the detecting means is configured to detect the period of generation of each of a plurality of types of noises of which levels are different from each other, the noises being contained in the signal received by the apparatus, and
    the deciding means is configured to decide the start time instant within a period selected from the periods of generation of the plurality of types of noises so that the communication is ended within the selected period, the selected period being longer than the estimated time.

7. The apparatus of claim 1, wherein the deciding means comprises
    means for determining whether or not it is avoidable that the communication is interfered with the noise based on the detected period of generation of the noise and the estimated time;
    means for dividing a command for the communication into a plurality of commands so that communication on each divided command is shorter than the communication on the before-divided command;
    means for estimating a time required for the communication on each divided command; and
    means for setting a stat time instant at which the communication on each divided command is started.

8. The apparatus of claim 7, further comprising means for determining whether or not the communication on each divided command is avoidable from being interrupted with the noise, on the basis of the estimated time required for the communication on each divided command and the detected period of generation of the noise,
    wherein the dividing means is configured to produce the divided commands with a transmission sequence, and
    the setting means is configured to set the start time instant for the communication on each divided command in the transmission sequence, if it is determined that, of the communication on the divided commands, the communication on a selected divided command is avoidable from being interrupted with the noise, the selected divided command being accordance with the transmission sequence.

9. The apparatus of claim 7, wherein the dividing means is configured to produce the divided commands so that the time required for the communication on each divided command is within a specified period of the periods of generation of the plurality of types of noises, the noise generating at the specified period having a given level and being the highest in a frequency of the generation.

10. The apparatus of claim 7, wherein the dividing means is configured to produce the divided commands so that the time required for the communication on each divided command is within each of plural specified periods of the periods of generation of the plurality of types of noises, the noise generating at the specified period having a given level.

11. An apparatus for communicating data with a data carrier by transmitting and receiving a signal to and from the data carrier without contact therebetween, the apparatus comprising:
    a detecting circuit detecting a period of generation of noise contained in the signal received by the apparatus;
    an estimating block estimating a time required from a start of communication scheduled next to an end of the communication, the start of the communication being a start of transmission of a command from the apparatus to the data carrier, and the end of the communication being an end of receiving a response from the data carrier;

a deciding block deciding a start time instant of the communication on the basis of the detected period of generation of the noise and the estimated time; and a performing block performing the communication so as to be started at the decided start time instant; and a block for determining whether or not the communication has been ended successfully, wherein the deciding block comprises a block for determining whether or not the detected period of generation of the noise is over a period of time obtained by doubling the estimated time.

12. The apparatus of claim 11, wherein the decided start time instant being a time instant when it is determined that the detected period of generation of the noise is over the period of time obtained by doubling the estimated period of time, and the performing block comprises a block for re-performing the communication immediately when it is determined that the communication has not been ended successfully.

13. The apparatus of claim 11, wherein the deciding block comprises a block for comparing the detected period of generation of the noise with the estimated time to determine whether or not it is unavoidable to be interfered by the noise if the command is transmitted immediately after the comparison is made; and a block for postponing the decided start time instant until a time instant immediately after the next generation of the noise if it is determined that it is unavoidable to be interfered by the noise.

14. The apparatus of claim 11, wherein the deciding block is configured to decide the start time instant so that the response from the data carrier is started immediately after the next generation of the noise.

15. The apparatus of claim 11, wherein the deciding block is configured to decide the start time instant within a period selected from the period of generation of the noise so that the communication is ended within the selected period, the selected period being longer than the estimated time.

16. The apparatus of claim 11, wherein the detecting block is configured to detect the period of generation of each of a plurality of types of noises of which levels are different from each other, the noises being contained in the signal received by the apparatus, and the deciding block is configured to decide the start time instant within a period selected from the periods of generation of the plurality of types of noises so that the communication is ended within the selected period, the selected period being longer than the estimated time.

17. The apparatus of claim 11, wherein the deciding block comprises a block for determining whether or not it is avoidable that the communication is interfered with the noise based on the detected period of generation of the noise and the estimated time;

a block for dividing a command for the communication into a plurality of commands so that communication on each divided command is shorter than the communication on the before-divided command;

a block for estimating a time required for the communication on each divided command; and a block for setting a stat time instant at which the communication on each divided command is started.

18. A method for communicating data with a data carrier by transmitting and receiving a signal to and from the data carrier without contact therebetween, comprising steps of:

detecting a period of generation of noise contained in the signal received by the apparatus;

estimating a time required from a start of communication scheduled next to an end of the communication, the start of the communication being a start of transmission of a command from the apparatus to the data carrier, and the end of the communication being an end of receiving a response from the data carrier;

deciding a start time instant of the communication on the basis of the detected period of generation of the noise and the estimated time; and performing the communication so as to be started at the decided start time instant; and determining whether or not the communication has been ended successfully, the deciding step comprises determining whether or not the detected period of generation of the noise is over a period of time obtained by doubling the estimated time.

19. The method of claim 18, wherein the decided start time instant being a time instant when it is determined that the detected period of generation of the noise is over the period of time obtained by doubling the estimated period of time, and the performing step comprises re-performing the communication immediately when it is determined that the communication has not been ended successfully.

* * * * *

UNITED STATES PATENT AND TRADEMARK OFFICE
CERTIFICATE OF CORRECTION

PATENT NO. : 7,957,473 B2
APPLICATION NO. : 11/826852
DATED : June 7, 2011
INVENTOR(S) : Shimizu It is certified that error appears in the above-identified patent and that said Letters Patent is hereby corrected as shown below:

Column 12

Correct Item- Claim 7:

The apparatus of claim 1, wherein the deciding means comprises means for determining whether or not it is avoidable that the communication is interfered with the noise based on the detected period of generation of the noise and the estimated time; means for dividing a command for the communication into a plurality of commands so that communication on each divided command is shorter than the communication on the before-divided command; means for estimating a time required for the communication on each divided command; and means for setting a ~~stat~~ start time instant at which the communication on each divided command is started.

Column 14

Correct Item- Claim 17:

The apparatus of claim 11, wherein the deciding block comprises a block for determining whether or not it is avoidable that the communication is interfered with the noise based on the detected period of generation of the noise and the estimated time; a block for dividing a command for the communication into a plurality of commands so that communication on each divided command is shorter than the communication on the before-divided command; a block for estimating a time required for the communication on each divided command; and a block for setting a ~~stat~~ start time instant at which the communication on each divided command is started.

Signed and Sealed this
Twenty-seventh Day of September, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,957,473 B2 | Page 1 of 1 |
| APPLICATION NO. | : 11/826852 | |
| DATED | : June 7, 2011 | |
| INVENTOR(S) | : Shimizu | |

It is certified that error appears in the above-identified patent and that said Letters Patent is hereby corrected as shown below:

<u>Column 12, lines 11-24</u>

Claim 7 should read:

The apparatus of claim 1, wherein the deciding means comprises means for determining whether or not it is avoidable that the communication is interfered with the noise based on the detected period of generation of the noise and the estimated time; means for dividing a command for the communication into a plurality of commands so that communication on each divided command is shorter than the communication on the before-divided command; means for estimating a time required for the communication on each divided command; and means for setting a ~~stat~~ <u>start</u> time instant at which the communication on each divided command is started.

<u>Column 14, lines 3-16</u>

Claim 17 should read:

The apparatus of claim 11, wherein the deciding block comprises a block for determining whether or not it is avoidable that the communication is interfered with the noise based on the detected period of generation of the noise and the estimated time; a block for dividing a command for the communication into a plurality of commands so that communication on each divided command is shorter than the communication on the before-divided command; a block for estimating a time required for the communication on each divided command; and a block for setting a ~~stat~~ <u>start</u> time instant at which the communication on each divided command is started.

This certificate supersedes the Certificate of Correction issued September 27, 2011.

Signed and Sealed this
Twenty-fifth Day of October, 2011

David J. Kappos
*Director of the United States Patent and Trademark Office*